(12) United States Patent
Xie et al.

(10) Patent No.: US 10,067,620 B2
(45) Date of Patent: Sep. 4, 2018

(54) MUTUAL CAPACITIVE EMBEDDED TOUCH PANEL

(71) Applicant: Wuhan China Star Optoelectronics Technology Co., Ltd., Wuhan, Hubei (CN)

(72) Inventors: Jianxing Xie, Guangdong (CN); Yu-cheng Tsai, Guangdong (CN); Chun-hung Huang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 293 days.

(21) Appl. No.: 15/021,658

(22) PCT Filed: Jan. 29, 2016

(86) PCT No.: PCT/CN2016/072817
§ 371 (c)(1),
(2) Date: Mar. 11, 2016

(87) PCT Pub. No.: WO2017/113469
PCT Pub. Date: Jul. 6, 2017

(65) Prior Publication Data
US 2018/0046274 A1  Feb. 15, 2018

(30) Foreign Application Priority Data
Dec. 31, 2015 (CN) .......................... 2015 1 1028551

(51) Int. Cl.
*G06F 3/044* (2006.01)
*G06F 3/041* (2006.01)
*G02F 1/1343* (2006.01)

(52) U.S. Cl.
CPC ............ *G06F 3/044* (2013.01); *G06F 3/0412* (2013.01); *G02F 2001/134318* (2013.01); *G06F 2203/04112* (2013.01)

(58) Field of Classification Search
CPC ...... G06F 3/044; G06F 3/0412; G06F 3/0416; G06F 3/016; G02F 1/134309;
(Continued)

(56) References Cited

U.S. PATENT DOCUMENTS

2004/0109120 A1* 6/2004 Lee .................... G02F 1/134363
349/141
2010/0110038 A1* 5/2010 Mo .......................... G06F 3/044
345/174
(Continued)

FOREIGN PATENT DOCUMENTS

CN  103105991 A  5/2013
CN  103777815 A  5/2014
(Continued)

*Primary Examiner* — Sanjiv D Patel
(74) *Attorney, Agent, or Firm* — Andrew C. Cheng (57) ABSTRACT

A mutual capacitive embedded touch panel is provided. The touch panel includes multiple touch units, each is formed by a pixel electrode layer, a first intermediate layer, a second intermediate layer, a common electrode layer, a third intermediate layer and a thin-film transistor array, wherein, the common electrode layer of each touch unit can be divided into a driving region, a first floating region, a second floating region, a first shielding region and a second shielding region; two opposite sides of the driving region respectively form the first and the second shielding regions; the first and the second floating regions are respectively formed at sides of the first second shielding regions away from the driving region. Accordingly, capacitance at the junction portion is similar with capacitance of the scanning line at the non- (Continued)

junction portion in to avoid generating obvious stripes at the junction portion of two adjacent touch units.

7 Claims, 4 Drawing Sheets

(58) Field of Classification Search
CPC .. G02F 2201/121; G02F 2001/134318; G09G 2300/0426; H05K 1/0218; H05K 9/0071
See application file for complete search history.

(56) References Cited

U.S. PATENT DOCUMENTS

| | | | |
|---|---|---|---|
| 2012/0105337 A1 | 5/2012 | Jun | |
| 2015/0220181 A1* | 8/2015 | Jung | G06F 3/044 345/174 |
| 2016/0179252 A1* | 6/2016 | Chang | G06F 3/0412 345/174 |
| 2016/0266670 A1* | 9/2016 | Chen | G06F 3/044 |
| 2016/0291781 A1* | 10/2016 | He | G06F 3/0416 |
| 2016/0357337 A1* | 12/2016 | Li | G06F 3/044 |

FOREIGN PATENT DOCUMENTS

| | | |
|---|---|---|
| CN | 104460139 A | 3/2015 |
| CN | 104615322 A | 5/2015 |
| CN | 105117085 A | 12/2015 |
| WO | WO2013141056 A1 | 9/2013 |

* cited by examiner

MUTUAL CAPACITIVE EMBEDDED TOUCH PANEL

BACKGROUND OF THE INVENTION

1. Field of the Invention

The invention relates to a structure of an embedded touch panel, and more particularly to a mutual capacitive embedded (in cell) touch panel.

2. Description of Related Art

Along with the development of electronic science technology, capacitive touch panel (hereinafter, referred to "capacitive panel") is widely used in various electronic devices, such as: smartphone, tablet, game console, and personal digital assistant that having touch panels. The structure of the current capacitive panel includes external mounted capacitive panel represented by G+G, GF, GFF, and OGS and embedded capacitive panel represented by On cell and In cell.

In recent years, people have been searching for user experience of thinner type so that three technologies of OGS, On-cell and In-cell are competed with each other. Because the unique advantages in the manufacturing process, the In-cell technology can reach to be thinner, providing better light transmittance, and more consistent with the demand of the customer such that the In-cell technology become a mainstream of the capacitive panel.

Figure 1:
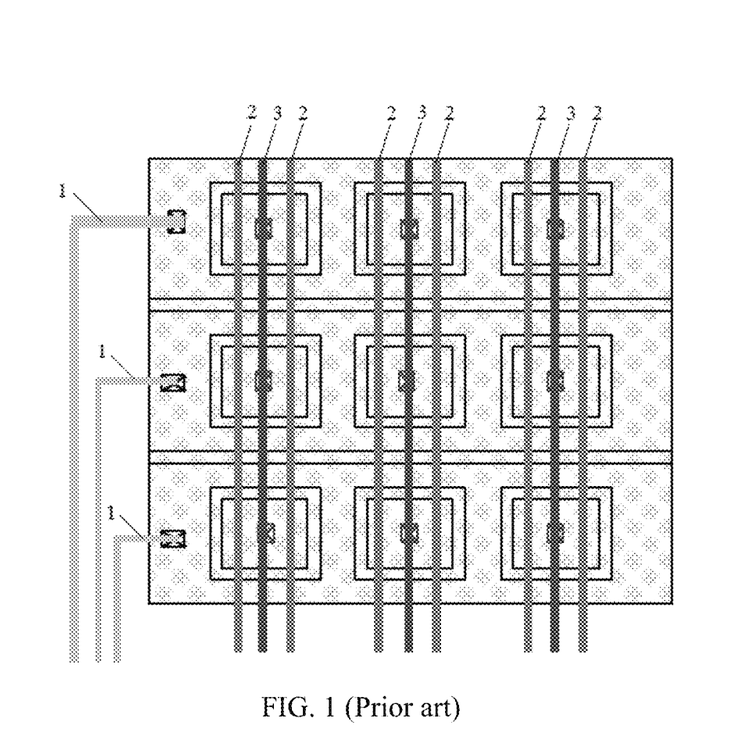
FIG. 1 is a plane distribution diagram of an embedded capacitive panel having in-cell structure in the conventional art.
Figure 2:
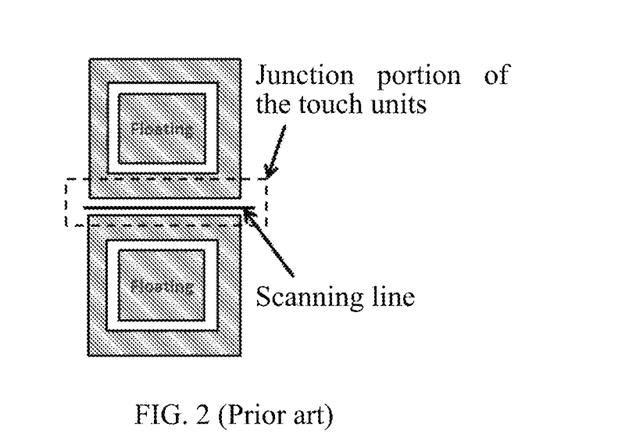
FIG. 2 is a plane distribution diagram of two adjacent touch units shown in FIG. 1.

FIG. 1 shows a plane arrangement way of an embedded capacitive panel having an in-cell structure in the conventional art. As shown in FIG. 1, a numeral 1 is a driving signal providing trace, a numeral 2 is a touch sensing electrode and a numeral 3 is a common electrode trace. FIG. 2 is a plane arrangement diagram of two adjacent units in FIG. 1. From FIG. 2, a gap is existed at a junction portion of the two adjacent touch units, and at the junction portion, an overlapping of a scanning line and the common electrode layer does not exist such that a capacitance at the junction portion is lower. An overlapping of the scanning line and the common electrode layer is existed at a non-junction portion such that a capacitance at the non-junction portion is higher such that the uniformity of the embedded capacitive panel having in-cell structure is decreased. That is, at the junction portion of two adjacent touch units, obvious stripes are generated.

SUMMARY OF THE INVENTION

The exemplary embodiment of the present disclosure is to provide a mutual capacitive embedded (in-cell) touch panel in order to improve the uniform performance in the display of the mutual capacitive embedded (in-cell) touch panel of the conventional art.

According to one aspect of an exemplary embodiment of the present invention is to provide a mutual capacitive embedded touch panel, comprising: a touch unit array formed by multiple touch units, wherein, each touch unit is formed by a pixel electrode layer, a first intermediate layer, a second intermediate layer, a common electrode layer, a third intermediate layer and a thin-film transistor array, wherein, the common electrode layer of each touch unit can be divided into a driving region, a first floating region, a second floating region, a first shielding region and a second shielding region; two opposite sides of the driving region respectively form the first shielding region and the second shielding region; the first floating region and the second floating region are respectively formed at sides of the first shielding region and the second shielding region away from the driving region.

Selectively, the driving region, the first floating region, the second floating region, the first shielding region and the second shielding region are all located at a side of the common electrode layer close to the third intermediate layer.

Selectively, the driving region, the first floating region, the second floating region, the first shielding region and the second shielding region are electrically independent with each other.

Selectively, the embedded touch panel further includes: a touch driving electrode and a touch sensing electrode, wherein, the touch driving electrode is arranged in the driving region of the common electrode layer, the touch sensing electrode is arranged in an orthogonal projection region on the first intermediate layer projected by the first floating region or the second floating region in the common electrode layer, and the touch sensing electrode is located at a side of the first intermediate layer close to the second intermediate layer.

Selectively, the mutual capacitive embedded touch panel further comprises a driving signal providing trace, a common signal providing trace, the driving signal providing trace is arranged in an orthogonal projection region on the first intermediate layer projected by the driving region in the common electrode layer, and the driving signal providing trace is electrically connected with the touch driving electrode through a first blind vias, the common signal providing trace is arranged in an orthogonal projection region on the first intermediate layer projected by the first floating region or the second floating region in the common electrode layer, the common signal providing trace is electrically connected with the first floating region through a second blind vias, and the common signal providing trace is connected with the second floating region through a third blind vias in order to provide a common voltage signal for the first floating region and the second floating region in a display stage of the embedded touch panel.

Selectively, the touch driving electrode is connected with one or more driving signal providing trace.

Selectively, the floating regions located at a same column of the embedded touch panel can commonly use one or more common signal providing trace.

Selectively, each of the touch sensing electrodes, the driving signal providing trace and the common signal providing trace adopts a metal trace or made of a conductive material.

Selectively, the embedded touch panel further includes a first shielding signal providing trace and a second shielding signal providing trace, wherein, the first shielding signal providing trace is arranged in an orthogonal projection region on the first intermediate layer projected by the first shielding region in the common electrode layer, the first shielding signal providing trace is connected with the first shielding region through a fourth blind vias, the second shielding signal providing trace is arranged in an orthogonal projection region on the first intermediate layer projected by the second shielding region in the common electrode layer, and the second shielding signal providing trace is connected with the second shielding region through a fifth blind vias Selectively, each of the first shielding signal providing trace and the second shielding signal providing trace is made of a dielectric material.

Adopting the above embedded touch panel, the capacitance of the scanning line at the junction portion is similar with the capacitance of the scanning line at the non-junction portion in order to avoid the problem of generating obvious stripes at the junction portion of two adjacent touch units.

DETAILED DESCRIPTION OF THE PREFERRED EMBODIMENT

The following content combines with the drawings and the embodiment for describing the present invention in detail. The example of the embodiment of the present invention is shown in the figures. However, many other forms can be used to implement the present invention. Besides, the present invention should not be interpreted to be limit in the specific embodiment described here. On the contrary, providing these embodiments can make the present disclosure to be thorough and complete, and these embodiments fully transmit the scope of the present disclosure to the person skilled in the art.

For clarity and brevity, the description for unnecessary parts or elements may be omitted. A same numeral in the entire specification and figures represents a same element. In the figures, for clarity, the size and the relative size of layer and region are enlarged, and a distance and a relative distance among elements may be enlarged. Therefore, the figures only schematically show a relative location relationship among the elements, and not limited.

It can also be understood that when a layer or an element is called be to "above" or "on" another element or layer, or called "connected with" another element or layer, the layer or the element can directly form on the another layer or the element or directly connected with another element or layer, or an intermediate layer or an intermediate element can exist. On the contrary, when a layer or an element is called be to "directly above" or "directly on" another element or layer, or called "directly connected with" another element or layer, an intermediate layer or an intermediate element do not exist. The term "and/or" used here includes any combination or all combinations of one or multiple related terms.

It should be noted that although the relational terms such as first and second are used here to describe different elements, components, regions layers and/or parts. However, these elements, components, regions layers and/or parts are not limited by the relational terms. The relational terms are only used to distinguish one element, component, region, layer and/or part from another element, component, region, layer and/or part. Therefore, without leaving the teaching of the present invention, the first element, component, region, layer or part can be named as the second element, component, region, layer or part.

The space relational terms here such as "below", "located under", "above", are used to describe a relationship between one element or feature and another element or feature. It can be noted that the space relational terms are used to include the direction of the device described in the figures and different directions of the device when the device under using or operation. For example, when the device in the figure is reversed, the terms "below", "located under", "above" element or feature will subsequently become "above", "located below", "below" element or feature. Therefore, the relational term "below" can include two directions of "above" and "below". The device can be located additionally (rotate 90 degrees or other directions), and correspondingly be explained the space relational terms.

The exemplary embodiment of the present invention provides a mutual capacitive embedded touch panel. The embedded touch panel integrates touch and display together, and the embedded touch panel adopts two layers and mutual capacitive structure. That is, respectively arranging the touch driving electrode and the touch sensing electrode to different layers of the embedded touch panel such that no additional bridging traces are required among the touch driving electrodes so as to decrease the complexity of the embedded touch panel.

Figure 3:
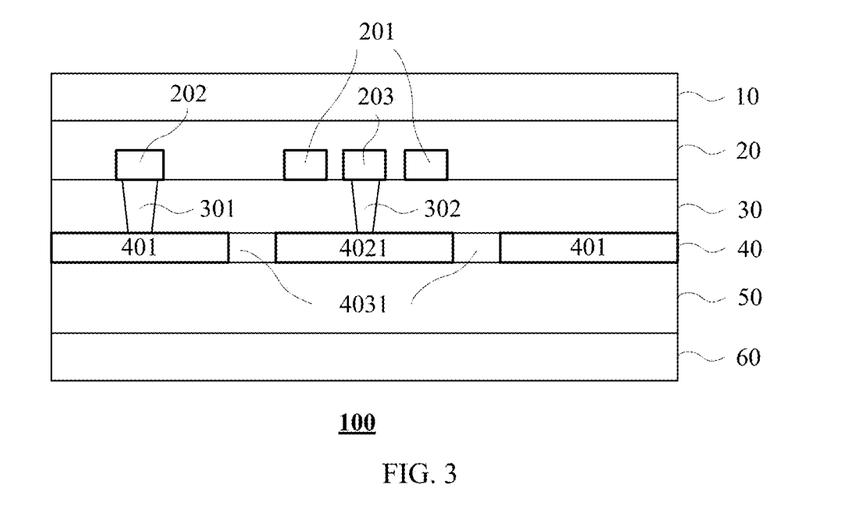
FIG. 3 is a cross-sectional view of one touch unit of a mutual capacitive embedded touch panel according to an embodiment of the present invention.

The following content refer to FIG. 3 to describe the mutual capacitive embedded touch panel according to an embodiment of the present invention in detail.

FIG. 3 is a cross-sectional view of one touch unit of a mutual capacitive embedded touch panel according to an embodiment of the present invention.

As shown in FIG. 3, mutual capacitive embedded touch panel according to an embodiment of the present invention includes a touch unit array formed by multiple touch units. Each touch unit 100 is formed by a pixel electrode layer 10, a first intermediate layer 20, a second intermediate layer 30, a common electrode layer 40, a third intermediate layer 50 and a thin-film transistor array 60.

Specifically, the common electrode layer 40 can be divided into a driving region, a first floating region, a second floating region, a first shielding region and a second shielding region. Preferably, the driving region, the first floating region, the second floating region, the first shielding region and the second shielding region are all located at a side of the common electrode layer 40 close to the third intermediate layer 50.

Figure 4:
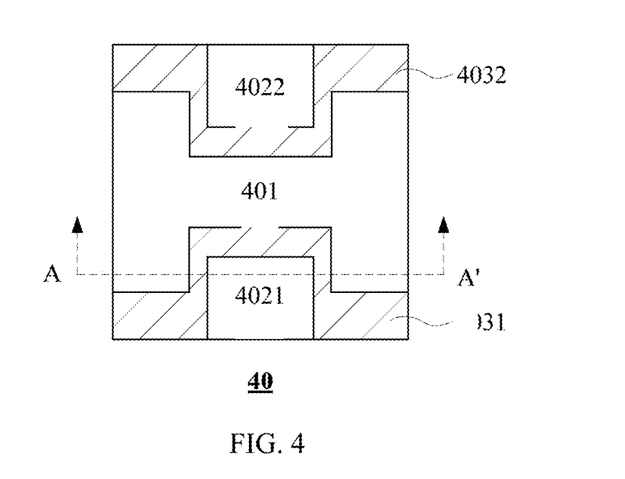
FIG. 4 is a plane distribution diagram of a common electrode layer of the touch unit shown in FIG. 3 according to an embodiment of the present invention.

The following content will refer to FIG. 4 to describe a location relationship among the driving region, the first floating region, the second floating region, the first shielding region and the second shielding region in the common electrode layer 40 of the touch unit 100 shown in FIG. 3. It can be understood that the common electrode layer 40 shown in FIG. 3 is a cross-sectional view obtained along A-A' shown in FIG. 4.

FIG. 4 is a plane distribution diagram of a common electrode layer 40 of the touch unit 100 shown in FIG. 3 according to an embodiment of the present invention.

As shown in FIG. 4, the touch unit 100 can be divided into the driving region 401, the first floating region 4021, the second floating region 4022, the first shielding region 4031 and the second shielding region 4032. Preferably, the driving region 401 is H-shaped as shown in FIG. 4.

As an example, the driving region 401, the first floating region 4021, the second floating region 4022, the first shielding region 4031 and the second shielding region 4032 are electrically independent with each other. That is, among the above regions, gaps (or slits) are existed such that the above regions are not directly contacted with each other.

Specifically, two opposite sides of the driving region 401 respectively form the first shielding region 4031 and the second shielding region 4032. The first floating region 4021 and the second floating region 4022 are respectively formed at sides of the first shielding region 4031 and the second shielding region 4032 away from the driving region 401.

Returning to FIG. 3, the mutual capacitive embedded touch panel according to an embodiment of the present invention can also include a touch driving electrode (not shown in the figure) and a touch sensing electrode 201.

Specifically, the touch driving electrode is arranged in the driving region 401 of the common electrode layer 40. The touch sensing electrode 201 is arranged in an orthogonal projection region on the first intermediate layer 20 projected by the first floating region 4021 or the second floating region 4022 in the common electrode layer 40 (FIG. 3 shows that the touch sensing electrode 201 is arranged in an orthogonal projection region on the first intermediate layer 20 projected by the first floating region 4021), and the touch sensing electrode 201 is located at a side of the first intermediate layer 20 close to the second intermediate layer 30.

It can be understood that the touch sensing electrode 201 is arranged in first intermediate layer 20 along a vertical direction of the embedded touch panel (that is, along a direction perpendicular to the cross section shown in FIG. 3). Therefore, the exemplary embodiment of the present invention that the touch sensing electrode 201 is arranged in an orthogonal projection region on the first intermediate layer 20 projected by the first floating region 4021 or the second floating region 4022 means that the touch sensing electrode 201 is arranged within a horizontal width range corresponding to the orthogonal projection region on the first intermediate layer 20 projected by the first floating region 4021 or the second floating region 4022 along the vertical direction of the embedded touch panel.

Besides, the mutual capacitive embedded touch panel according to an exemplary embodiment of the present invention further includes a driving signal providing trace 202, a common signal providing trace 203 and a first shielding signal providing trace and a second shielding signal providing trace (not shown in the figure).

As an example, each of the touch sensing electrodes, the driving signal providing trace 202 and the common signal providing trace 203 is made of a metal trace or a material having a conductive property. The first shielding signal providing trace and the second shielding signal providing trace can be made of various dielectric materials, the present disclosure is not limited. Here, it can be understood that the mutual capacitive embedded touch panel can also include a black matrix (also known as a light shielding matrix, BM). Correspondingly, the touch sensing electrode 201, the driving signal providing trace 202, the common signal providing trace 203, the first shielding signal providing trace and the second shielding signal providing trace are all arranged below the black matrix of the mutual capacitive embedded touch panel. Besides, the driving signal providing trace 202, the common signal providing trace 203, the first shielding signal providing trace and the second shielding signal providing trace are all located at a side of the first intermediate layer close to the second intermediate layer.

Specifically, the driving signal providing trace 202 is arranged in an orthogonal projection region on the first intermediate layer 20 projected by the driving region 401 in the common electrode layer 40, and the driving signal providing trace 202 is electrically connected with the touch driving electrode through a first blind vias 301. The common signal providing trace 203 is arranged in an orthogonal projection region on the first intermediate layer 20 projected by the first floating region 4021 (as shown in FIG. 3) in the common electrode layer 40. Or, the common signal providing trace 203 can be arranged in an orthogonal projection region on the first intermediate layer 20 projected by the second floating region 4022 (not shown in the figure). The common signal providing trace 203 is electrically connected with the first floating region 4021 through a second blind vias 302 (as shown in FIG. 3). The common signal providing trace 203 is connected with the second floating region 4022 through a third blind vias (not shown in the figure) in order to provide a common voltage signal (that is, Vcom signal) for the first floating region 4021 and the second floating region 4022 in a display stage.

Here, it can be understood that in a touch stage of the embedded touch panel, the first floating region 4021 and the second floating region 4022 are floating. That is, the common signal providing trace 203 does not provide any voltage signal for the first floating region 4021 and the second floating region 4022. Here, it can be understood that the driving signal providing trace 202 and the common signal providing trace 203 are not electrically conductive.

The first shielding signal providing trace is arranged in an orthogonal projection region on the first intermediate layer 20 projected by the first shielding region 4031 in the common electrode layer 40. The first shielding signal providing trace is connected with the first shielding region 4031 through a fourth blind vias. The second shielding signal providing trace is arranged in an orthogonal projection region on the first intermediate layer 20 projected by the second shielding region 4032 in the common electrode layer 40. The second shielding signal providing trace is connected with the second shielding region 4032 through a fifth blind vias.

Figure 5:
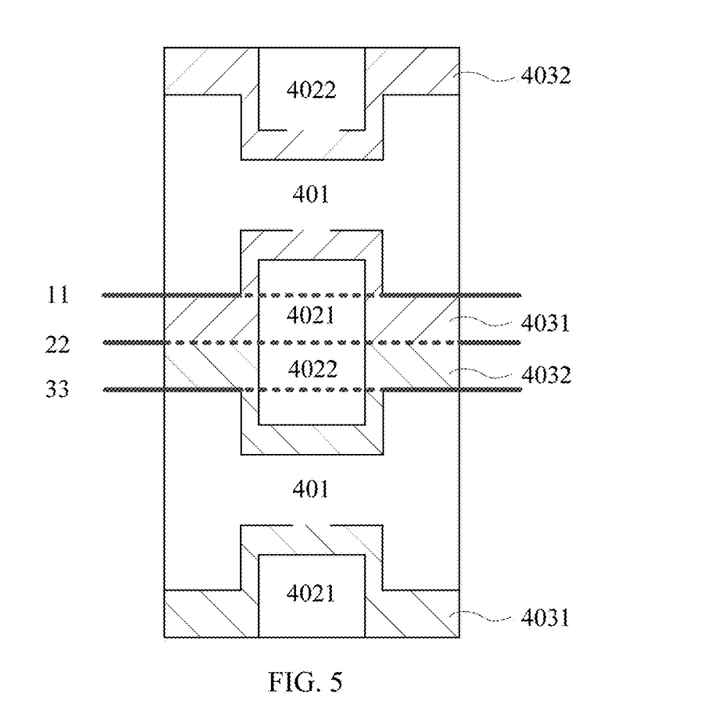
FIG. 5 is a plane distribution diagram of common electrode layers of two vertical adjacent touch units according to an embodiment of the present invention.
Figure 6:
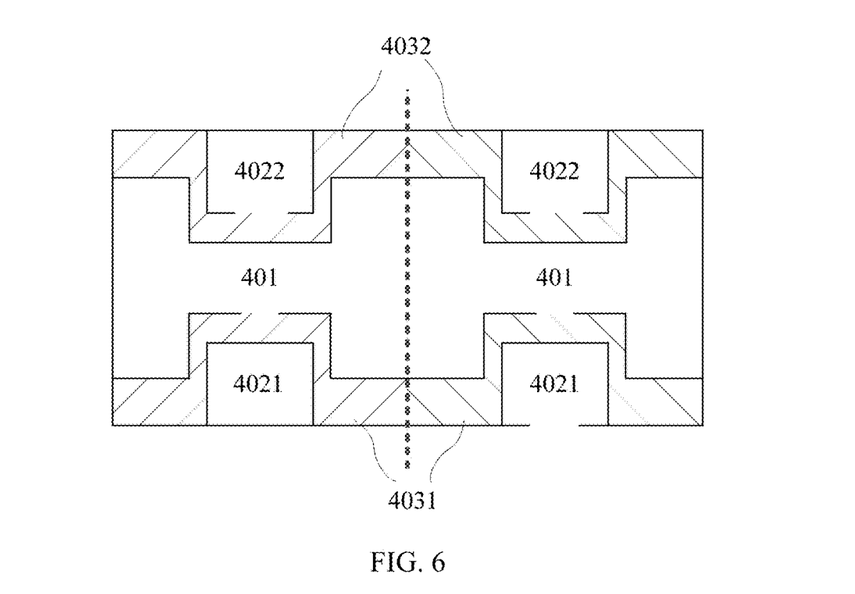
FIG. 6 is a plane distribution diagram of common electrode layers of two horizontal adjacent touch units according to an embodiment of the present invention.

Preferably, among the multiple touch units, a seamless arrangement form is adopted to form the touch unit array. With reference to FIG. 5 and FIG. 6, a plane arrangement way of the common electrode layer of two adjacent vertical and horizontal touch units is described in detail.

FIG. 5 is a plane distribution diagram of common electrode layers of two vertical adjacent touch units according to an embodiment of the present invention.

As shown in FIG. 5, in the present embodiment, each of numerals 11, 22 and 33 represents a scanning line in the embedded touch panel. Wherein, the scanning line 11 is a scanning line that passes through a gap between the driving region 401 and the first shielding region 4031 of an upper touch unit. The scanning line 22 is a scanning line that passes through a junction portion of two touch units. The scanning line 33 is a scanning line that passes through a gap between the driving region 401 and the second shielding region 4032 of a lower touch unit (the gap between the driving region 401 and the first shielding region 4031 of the upper touch unit and the gap between the driving region 401 and the second shielding region 4032 of the lower touch unit are not shown in the figure). Here, it can be understood that in an embedded touch panel, multiple scanning lines are provided, and in FIG. 5, in order to illustrate a structure feature of the embedded touch panel of the embodiment of the present invention, only three scanning lines are shown.

Because a seamless connection is formed between the two vertical adjacent touch units, no gap is existed between two vertical adjacent touch units. That is, the scanning line 22 located at the junction portion of the two adjacent touch units is overlapped with the common electrode layer 40 (the overlapped portion is shown as a dotted line portion of the scanning line 22 in FIG. 5). Accordingly, the scanning line 22 has higher capacitance such that the capacitance of the scanning line at the junction portion is similar with the capacitance of the scanning line at the non-junction portion in order to avoid the problem of generating obvious stripes at the junction portion of two adjacent touch units.

Besides, although the scanning line 11 passes through the gap between the driving region 401 and the first shielding region 4031 of the upper touch unit, a portion of the scanning line 11 is still overlapped with the first shielding region 4031 and the first floating region 4021 (the overlapped portion is shown as a dotted line portion of the scanning line 11 in FIG. 5). Accordingly, the capacitance of the scanning line 11 is similar with the capacitance of the scanning line at the non-junction portion. Similarly, although the scanning line 33 passes through the gap between the driving region 401 and the second shielding region 4032 of the lower touch unit, a portion of the scanning line 33 is still overlapped with the second shielding region 4032 and the second floating region 4022 (the overlapped portion is shown as a dotted line portion of the scanning line 33 in FIG. 5). Accordingly, the capacitance of the scanning line 33 is similar with the capacitance of the scanning line at the non-junction portion.

FIG. 6 is a plane distribution diagram of common electrode layers of two horizontal adjacent touch units according to an embodiment of the present invention.

Shown in FIG. 6, a seamless connection is formed between the two horizontal adjacent touch units, therefore, no gap is existed between the two vertical adjacent touch units.

Combined both with FIG. 5 and FIG. 6, in the embodiment of the present invention, a seamless connection is adopted among multiple touch units to form a touch unit array such that capacitances of scanning lines at different locations in the entire mutual capacitive embedded touch panel are closer in order to improve the display performance of the entire touch panel.

Figure 7:
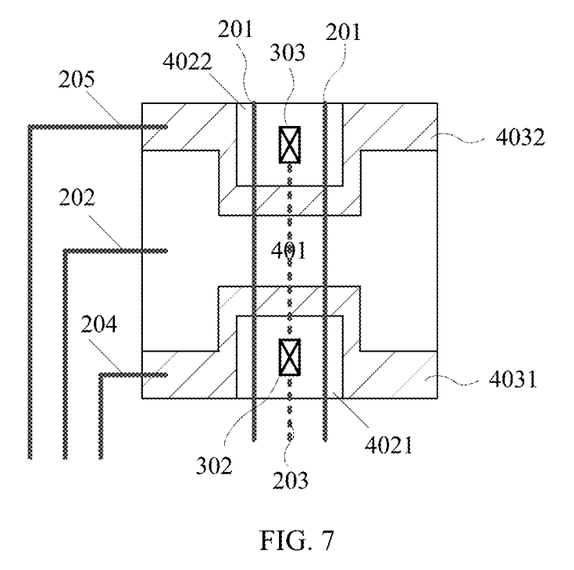
FIG. 7 is a plane distribution diagram of each trace of the touch unit shown in FIG. 3 according to an embodiment of the present invention.

FIG. 7 is a plane distribution diagram of each trace of the touch unit shown in FIG. 3 according to an embodiment of the present invention.

As shown in FIG. 7, numeral 201 represents a touch sensing electrode arranged along a vertical direction of the embedded touch panel in the first intermediate layer 20, numeral 203 represents a common electrode providing trace arranged along a vertical direction of the embedded touch panel in the first intermediate layer 20, numeral 302 represents a first blind hole for connecting the common signal providing trace 203 and the first floating region 4021, numeral 303 represents the second blind hole for connecting the common signal providing trace 203 and the second floating region 4022. The numeral 202 represents the driving signal providing trace, the numeral 204 represents a first shielding signal providing trace, and the numeral 205 represents a second shielding signal providing trace.

Preferably, the touch driving electrode in the driving region 401 can be connected with one or more driving signal providing trace 202. Here, it can be understood that in the embodiment of the present invention, one touch driving electrode can be connected with one or more driving signal providing trace according to an impedance matching principle. When a touch driving electrode is connected with multiple driving signal providing traces, the impedance of the trace can be effectively decreased.

As an example, the floating regions (means the first floating region 4021 and the second floating region 4022) located at a same column of the embedded touch panel can commonly use one or more common signal providing trace 203. Here, the common signal providing trace 203 is used for connecting all of the first floating region 4021 and the second floating region 4022 located in a same column of the embedded touch pane. Because the electricity property of all of the first floating region 4021 and the second floating region 4022 in the embedded touch panel is the same, the floating regions located at the same column of the embedded touch panel can commonly use one or more common signal providing trace.

The mutual capacitive embedded touch panel of the exemplary embodiment of the present invention can simplify the complicated bridging structure of the conventional embedded capacitive panel, effectively reduce the process difficulty for forming vias, and reduce the decreasing of the yield rate because of forming vias at multiple layers. That is, simplify the structure of the touch panel and increase the process yield rate.

Besides, the structure of the touch unit of the mutual capacitive embedded touch panel of the exemplary embodiment of the present invention does not require additional bridging traces among touch driving electrodes, which is more suitable for applying in a high-level product design of high resolution and high aperture ratio.

Besides, the mutual capacitive embedded touch panel of the exemplary embodiment of the present invention adopts metal trace or a material having conductive property to manufacture the traces and the touch sensing electrodes, which can effectively reduce the resistance of the common electrode, increase the optical style.

Besides, the mutual capacitive embedded touch panel of the exemplary embodiment of the present invention can effectively increase the display performance and the touch performance of the two layers and mutual capacitive in-cell structure.

Besides, the mutual capacitive embedded touch panel of the exemplary embodiment of the present invention integrates the touch and the display into a display panel to increase the production efficiency.

The mutual capacitive embedded touch panel of the exemplary embodiment of the present invention can manufacture a thinner touch panel in order to apply to various electronic devices having touch panels.

The above content combines the embodiments to describe the present invention, however, the implement of the present invention is not limited. Within the spirit and scope of present invention, the person in this technology field can perform various modifications and variations. The modifications and variations are still covered by the claims in the present invention.

What is claimed is:

1. A mutual capacitive embedded touch panel, comprising:
   a touch unit array formed by multiple touch units, wherein, each touch unit is formed by a pixel electrode layer, a first intermediate layer, a second intermediate layer, a common electrode layer, a third intermediate layer and a thin-film transistor array,
   wherein, the common electrode layer of each touch unit can be divided into a driving region, a first floating region, a second floating region, a first shielding region and a second shielding region; two opposite sides of the driving region respectively form the first shielding region and the second shielding region; the first floating region and the second floating region are respectively formed at sides of the first shielding region and the second shielding region away from the driving region;

wherein the mutual capacitive embedded touch panel further comprises a driving signal providing trace, a common signal providing trace, the driving signal providing trace is arranged in an orthogonal projection region on the first intermediate layer projected by the driving region in the common electrode layer, and the driving signal providing trace is electrically connected with the touch driving electrode through a first blind vias, the common signal providing trace is arranged in an orthogonal projection region on the first intermediate layer projected by the first floating region or the second floating region in the common electrode layer, the common signal providing trace is electrically connected with the first floating region through a second blind vias, and the common signal providing trace is connected with the second floating region through a third blind vias in order to provide a common voltage signal for the first floating region and the second floating region in a display stage of the embedded touch panel;

wherein in a touch stage, the common signal providing trace does not provide any voltage signal for the first floating region and the second floating region;

wherein the first shielding region is connected to a first shielding signal providing trace, and the second shielding region is connected to a second shielding signal providing trace, wherein a seamless connection is formed between two vertical adjacent touch units such that no gap is existed between the two vertical adjacent touch units;

wherein the two vertical adjacent touch units include an upper touch unit and a lower touch unit, and a first floating region of the upper touch unit and a second floating region of the lower touch unit form the seamless connection; and wherein at least three scanning lines pass through the first floating region of the upper touch unit and the second floating region of the lower touch unit.

2. The mutual capacitive embedded touch panel according to claim 1, wherein, the driving region, the first floating region, the second floating region, the first shielding region and the second shielding region are all located at a side of the common electrode layer close to the third intermediate layer.

3. The mutual capacitive embedded touch panel according to claim 1, wherein, the driving region, the first floating region, the second floating region, the first shielding region and the second shielding region are electrically independent with each other.

4. The mutual capacitive embedded touch panel according to claim 1, wherein, the embedded touch panel further includes: a touch driving electrode and a touch sensing electrode, wherein, the touch driving electrode is arranged in the driving region of the common electrode layer, the touch sensing electrode is arranged in an orthogonal projection region on the first intermediate layer projected by the first floating region or the second floating region in the common electrode layer, and the touch sensing electrode is located at a side of the first intermediate layer close to the second intermediate layer.

5. The mutual capacitive embedded touch panel according to claim 1, wherein, the touch driving electrode is connected with one or more driving signal providing trace.

6. The mutual capacitive embedded touch panel according to claim 1, wherein, the floating regions located at a same column of the embedded touch panel can commonly use one or more common signal providing trace.

7. The mutual capacitive embedded touch panel according to claim 1, wherein, each of the touch sensing electrode, the driving signal providing trace and the common signal providing trace adopts a metal trace or made of a conductive material.

* * * * *